Jan. 25, 1955  P. O. NORDGÅRD  2,700,573
HAND TRUCK FOR TRANSPORTING BUILDING MATERIALS
Filed April 18, 1950  2 Sheets-Sheet 2
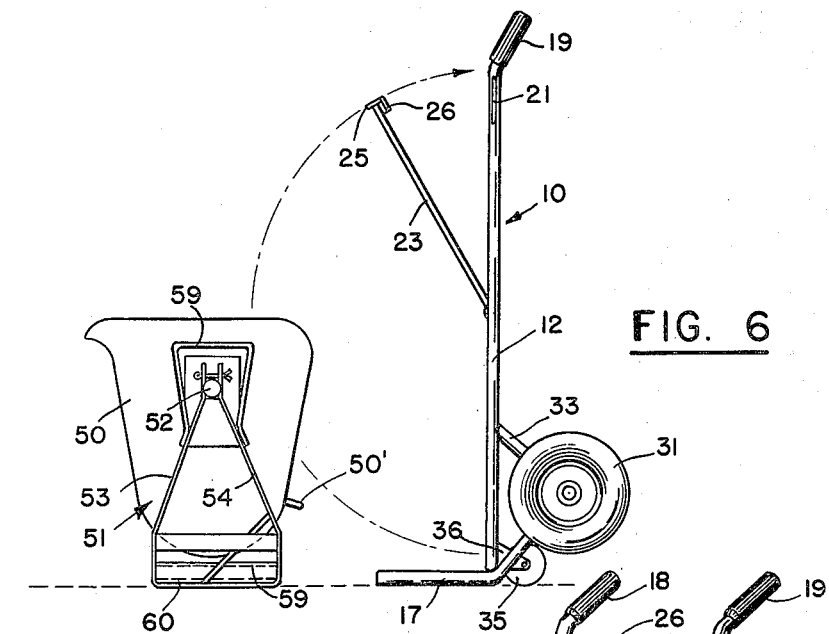
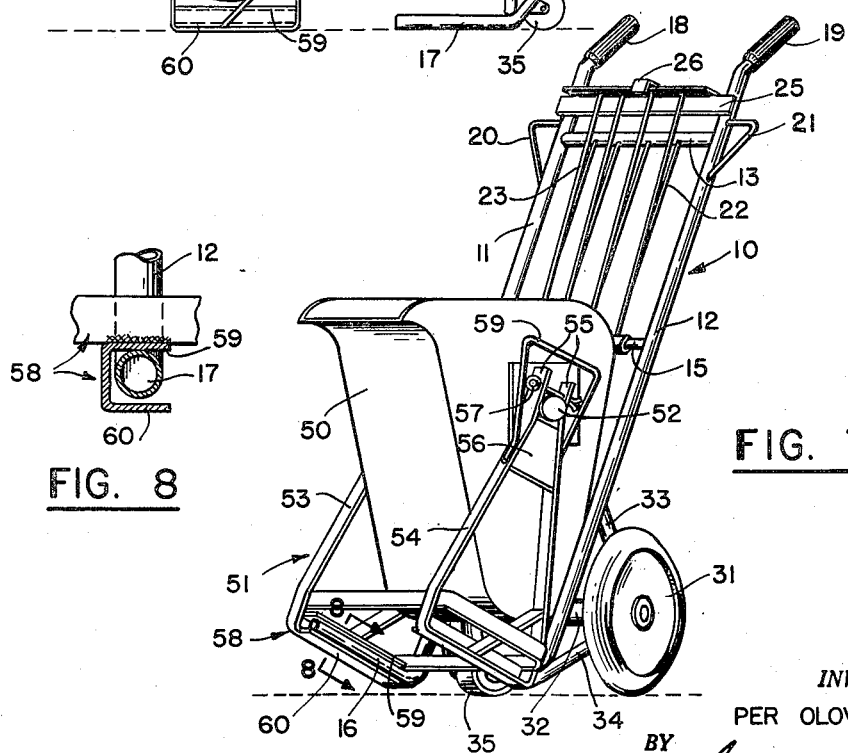
INVENTOR.
PER OLOV NORDGÅRD
BY
ATTORNEY

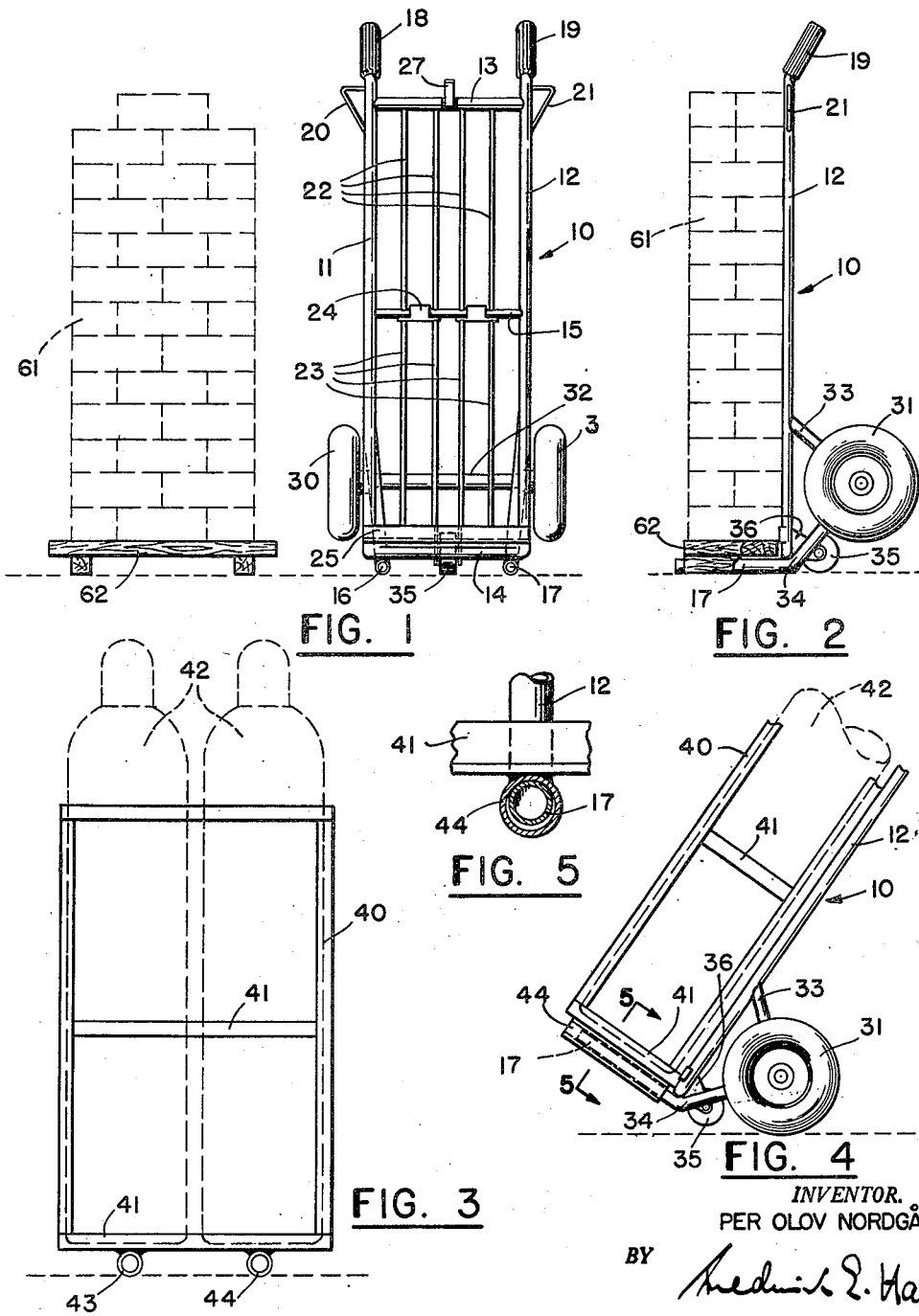

United States Patent Office 2,700,573
Patented Jan. 25, 1955

2,700,573

HAND TRUCK FOR TRANSPORTING BUILDING MATERIALS

Per O. Nordgård, Arboga, Sweden

Application April 18, 1950, Serial No. 156,564

Claims priority, application Sweden May 14, 1949

4 Claims. (Cl. 298—5)

The present invention relates to a hand truck, and more particularly to a wheeled hand truck for transportation of building material and allied material for instance, from a storage location to the location of use.

One of the objects of the invention is to provide a novel and improved hand truck of the general kind above referred to, which permits the transportation of a variety of building materials such as building material in solid form for instance stacked bricks and concrete slabs, and building material in semi-liquid form for instance mortar or concrete, and which also permits convenient transportation of allied material such as bottles for fluid under pressure used for instance in connection with welding operations.

Another object of the invention is to provide a novel and improved hand truck which can be easily handled by one man, is sturdy in design and has a high load capacity for its size.

Still another object of the invention is to provide a novel and improved hand truck which permits loading and unloading of bricks or other solid building material and bottles without requiring appreciable lifting of the building material or the bottles, and which more particularly permits directly to pick up a load placed upon a pallet-like base.

A further object of the invention is to provide a novel and improved hand truck which can be conveniently and rapidly converted to carry and transport either solid building material or semi-liquid building material or bottles.

A still further object of the invention is to provide a frame structure supporting an open container for semi-liquid building material which can be attached to and detached from the hand truck without assembly or disassembly of parts and without the use of tools, the said frame structure and the hand truck being so designed that the semi-liquid material in the container will not be spilled and is easily accessible either when the truck is rolled to its destination or is standing still.

Other and further objects, features and advantages of the invention will be described hereinafter and set forth in the appended claims forming part of the application.

In the accompanying drawing a preferred embodiment of the invention is shown by way of illustration and not by way of limitation.

In the drawing:

Fig. 1 is a front view of a hand truck according to the invention ready for loading stacked bricks also shown in Fig. 1.

Fig. 2 is a side view of the loaded truck of Fig. 1.

Fig. 3 is a front view of the frame structure for carrying bottles and loading the same on the truck.

Fig. 4 is a side view of the truck loaded with the frame structure of Fig. 3 and in position ready for rolling the truck to its destination.

Fig. 5 is a section taken on line 5—5 of Fig. 4 on an enlarged scale.

Fig. 6 is a side view of the truck and of a frame structure carrying a container for semi-liquid building material, the truck being shown in the position ready for loading with the frame structure and the container.

Fig. 7 is an isometric view of the truck loaded with the frame structure and the container of Fig. 6, and Fig. 8 is a section taken on line 8—8 of Fig. 7 on an enlarged scale.

Referring now to the figures in detail, the hand truck according to the invention comprises a frame structure, the principal parts of which are made of suitably bent metal tubes. More specifically, the rear wall of the truck is formed of a U-shaped tube generally designated by 10. The two shanks 11 and 12 of the U-frame are joined near their upper ends by a cross-tube or bar 13 and at a point intermediate to cross tube 13 and bight 14 of the U-frame by a second cross tube or bar 15. Tubular prongs 16 and 17 extend from the lower end of U-frame 10 fixedly secured to the bight 14. These prongs form a load receiving and carrying platform. The upper ends of shanks 11 and 12 are bent off to form hand bars upon which grips 18 and 19 are fitted. There is further provided a fixed grating 22 extending between cross tubes 13 and 15 and a pivotal grating 23. The latter grating is hinged to cross tube 15 by any suitable means such as conventional hinges 24. Grating 23 may either be placed in the position of Fig. 1 in which the two gratings 22 and 23 cover the entire space between shanks 11 and 12 of U-frame 10, or into the position of Fig. 7 in which the lower part of the space between shanks 11 and 12 of U-frame 10 is left uncovered for a purpose which will appear from the subsequent description. Grating 23 is retained in its lower position of Fig. 1 in which it is substantially coplanar with shanks 11 and 12 by a cross bar 25 which joins the free ends of the rods formed grating 23 and overlies shanks 11 and 12 as can best be seen in Fig. 1. The grating may be retained in the upper position of Fig. 7 by a hook 26 coacting with a catch 27 on cross tube 13, or it may rest by its own weight against shanks 11 and 12. The means for retaining grating 23 either in its upper or lower position are conventional and do not constitute part of the invention.

The truck is wheeled by means of two wheels 30 and 31 seated on an axle 32 mounted by means of brackets or arms 33 and 34 extending from U-frame 10. There is further provided a centrally disposed nose wheel 35 mounted by means of brackets 36 also extending from U-frame 10. Nose wheel 35 serves to support the truck in its stand-still or loading position as shown in Figs. 2 and 6 and also to facilitate pushing of the truck over minor obstacles.

The frame structure for carrying and loading bottles for gas or other fluid under pressure is shown in Figs. 3 and 4. It is constructed of several uprights and transverse angle bars or tubes 40 and 41 respectively. The specific arrangement of these frame members is not essential for the invention. It is merely essential that they form a cage safely retaining bottles 42. The part of the frame structure with which the invention is concerned are two tubes 43 and 44 the dimensions and spacing of which are such that they can be pushed upon prongs 16 and 17 as is shown in Figs. 4 and 5.

Figs. 6 and 7 show a container 50 with a handle 50' for semi-liquid building material such as concrete and a frame structure generally designated by 51 for supporting same. The container is an open container conventional for the purpose. It is provided on each side with an axle stub 52 by means of which the container is tiltably supported on the frame structure. This frame structure comprises two substantially triangular uprights 53 and 54. The upper ends 55 of the uprights are parallel to form together with a member 56 bearings for axle stubs 52. The stubs are secured in their bearings by a cotter pin 57. The rotational axis of the container lies perpendicularly over the center point of the base 58 of the frame structure and is so disposed that it is slightly rearward of the rotational axis of wheels 30 and 31 when the truck is tilted for wheeling. Handles 59 centrically disposed relative to axle stubs 52 serve to lift container 50 out of its bearings. The base 58 of the frame structure is formed with two flanges 59 and 60 as can best be seen in Fig. 8 to receive therebetween prongs 16 and 17.

The operation of the hand truck as hereinbefore described, is as follows:

Let it be assumed that it is desired to load the hand truck with bricks 61 stacked on a pallet 62. For this purpose, grating 23 is placed in the position of Fig. 1 and prongs 16 and 17 are pushed into the hollow space below the pallet platform with the truck in the position of Fig. 1 or 2. The truck is now tilted until its running wheels 30 and 31 rest upon the surface and is pushed to its destination. To unload the truck, it is returned to the up and down position of Fig. 2 in which prongs 16 and 17 can be withdrawn from the pallet. As is apparent, neither the loading nor the unloading of the truck requires lifting of the bricks.

Similarly, the frame cage for the bottles can be loaded and unloaded by simply pushing prongs 16 and 17 into tubes 43 and 44 and withdrawing the prongs therefrom with the hand truck in the position of Fig. 2.

When it is desired to load the truck with container 50 and the frame structure 51 therefor, grating 23 is fitted into its upper position as shown in Figs. 6 and 7 to permit the container to swing between shanks 11 and 12 when the truck is tilted for pushing.

The loading and unloading of frame structure 51 is basically the same as described in connection with Figs. 1 to 5 inclusive, that is, the hand truck is placed in the position of Fig. 6 and prongs 16 and 17 are fitted between flanges 59 and 60 or withdrawn therefrom. The container will remain by its own weight in vertical position in each position of tilt of the hand truck, the upwardly turned grating 23 providing space for the container between shanks 11 and 12.

Experience has shown that a hand truck having a width fitting through the narrowest standard door can load between 50 to 90 bricks and at least 60 liters of mortar or other semi-liquid building material.

What is claimed is:

1. A hand truck for transporting building material in shaped solid form and in semi-liquid form respectively, the said truck including a back frame comprising two longitudinal bars having handle bars at one end and disposed substantially parallel to each other spaced apart, the ends of the bars having the handle bars forming the upper end of the frame, the said frame further comprising rods extending between the upper part of said longitudinal bars, a platform disposed at a right angle to said frame and comprising two substantially parallel prongs, each extending from the lower end of said longitudinal bars, a pair of running wheels, a support frame supporting said running wheels and secured to said longitudinal bars at the side thereof opposite to said platform, said running wheels being disposed in a spatial relationship in which either said platform or said running wheels are resting upon a plane base upon which the truck is placed, the said back frame and the said platform constituting a carrying base for supply of solid building material, a container adapted to store therein a supply of semi-liquid building material, and a second support frame supporting said container tiltable about a horizontal axis, said second support frame having a base portion including guide means adapted to be removably fitted upon said prongs for supporting the second support frame upon said platform, the said longitudinal bars providing space therebetween for tilting the container between said bars when the truck is in the position in which the running wheels thereof are resting on the base.

2. A hand truck according to claim 1, wherein the guide means included in said base portion of the second support frame comprise two guide members slidably fittable upon said prongs, and wherein said second support frame further comprises uprights extending from the guide members and mounting an axle for tiltably supporting said container.

3. A hand truck according to claim 1, wherein a grating is hinged to said back frame approximately at the lower end of said rods, the said grating being pivotal between an upper limit position substantially parallel to the said rods and a lower limit position substantially coplanar with the longitudinal bars for filling the space between the lower parts of said longitudinal bars thereby providing a support for solid building material placed upon said back frame and said platform.

4. A hand truck according to claim 1 and further comprising a support structure for supporting thereon bottles containing a compressed fluid, the said support structure having a base portion including guide means also adapted to be removably fitted upon said platform prongs for selectively either supporting said second support frame or said support structure on said platform.

References Cited in the file of this patent

UNITED STATES PATENTS

| Number | Name | Date |
|---|---|---|
| 372,976 | Heilman | Nov. 8, 1887 |
| 555,532 | Percy | Mar. 3, 1896 |
| 570,400 | Hill | Oct. 27, 1896 |
| 909,297 | Helgeson | Jan. 12, 1909 |
| 1,299,829 | Goodyear | Apr. 8, 1919 |
| 1,490,361 | Brown et al. | Apr. 15, 1924 |
| 1,800,679 | Day | Apr. 14, 1931 |
| 1,832,523 | Berger | Nov. 17, 1931 |
| 1,882,307 | Venable | Oct. 11, 1932 |
| 2,387,744 | Clapp | Oct. 30, 1945 |
| 2,543,254 | Osborn | Feb. 27, 1951 |